Aug. 21, 1956 J. LANDIS 2,759,264
DENTAL MODEL SURVEYOR
Filed Feb. 10, 1955

INVENTOR.
Joseph Landis
BY S. O. St. Palley
Patent Agent

United States Patent Office 2,759,264
Patented Aug. 21, 1956

2,759,264

DENTAL MODEL SURVEYOR

Joseph Landis, East Haven, Conn.

Application February 10, 1955, Serial No. 487,299

4 Claims. (Cl. 32—67)

My invention relates to improvements in dental model surveyors, and more particularly in the dental model surveyor described in my prior patent application Serial No. 394,078 filed on November 24, 1953, now Patent No. 2,703,453. The dental model surveyors are generally used for paralleling and analyzing the plaster model of dentures in order to determine the contour and the undercut of the teeth. This work is usually performed by placing the dental model tangentially to a vertically disposed analyzing pin and observing the gap between them. With the ordinary illumination the accuracy of this observation is often jeopardized by the shadow of the analyzing pin cast upon the surface of the dental model adjacent to the gap.

The principal object of my invention is to provide a dental model surveyor in which the disturbing effect of the shadow of the analyzing pin is eliminated by the application of a Lucite element of improved construction producing a screen of diffused light in the background of the gap observed, thereby promoting very effectively the accuracy of the observation.

Another object of my invention is to provide a dental model surveyor in which the Lucite element, due to its novel ball and socket support and angularly variable sliding adjustment, can be satisfactorily adapted to the various forms of the analyzing pins and surveyor spindles used in the art.

A further object of my invention is to provide a dental model surveyor which, due to the fact that the Lucite element can operate successfully with the various analyzing pins and surveyor spindles available or in production in the art, can be manufactured very economically with the minimum new tooling.

Other objects and advantages of my invention will be apparent during the course of the following description.

Figure 1:
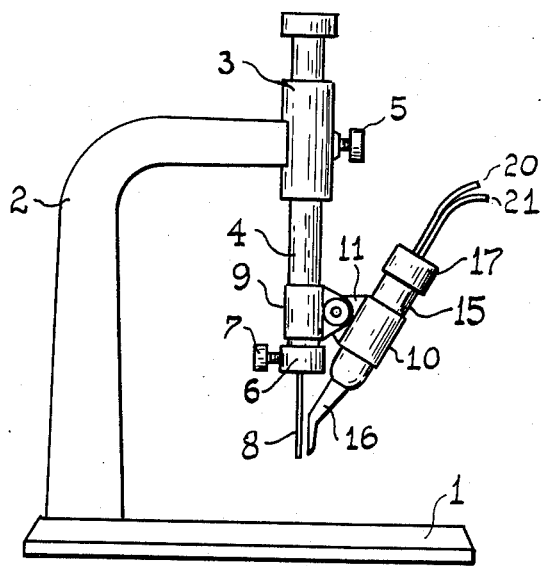
Figure 2:
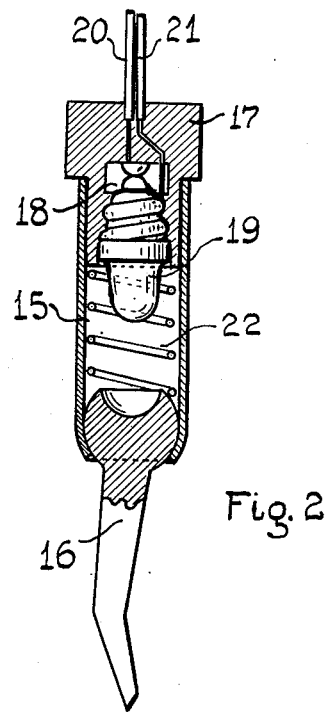
Figure 3:
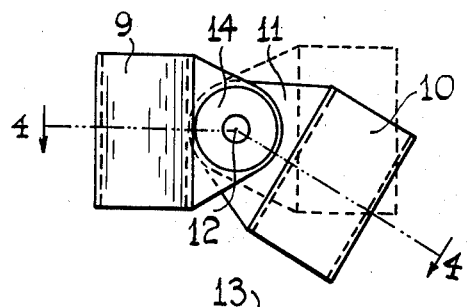
Figure 4:
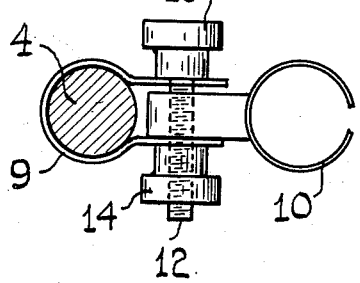

In the accompanying drawing, forming a part of this application, wherein, for the purpose of illustration, is shown a preferred embodiment of my invention, Figure 1 is a side view of my dental model surveyor, Figure 2 is a longitudinal sectional view of the illuminator tube and the associated parts, Figure 3 is an enlarged side view of the illuminator supporting members, Figure 4 is a sectional view on the line 4—4 of Fig. 3.

In the drawing, wherein like numerals are employed to designate like parts, in Fig. 1 the numeral 1 designates the base of the dental model surveyor, which is machined to give a flat surface for the deposition of the dental model.

Attached to this base is the supporting stand 2, carrying the sleeve 3, which has an axis perpendicular to the surface of the base 1. Slidably and rotatably mounted in said sleeve is the spindle 4, which can be secured in position by means of the clamping screw 5. Secured to the lower end of the spindle 4 is the pin holder 6 with screw 7, adapted to securely hold the analyzing pin 8.

Fig. 1 shows a straight analyzing pin, it is, however, within the spirit of my invention to employ analyzing pins of different forms, made of metal or of some compound which leaves a mark on the dental model at the points of contact.

Attached to the spindle 4 are the illuminator supporting members, consisting of the spindle clamp 9, the illuminator clamp 10 with lug 11, the screw 12 with head 13, and the thumb nut 14, the details of which are shown in Figs. 3 and 4.

In this preferred form the spindle clamp 9 consists of a resilient band, surrounding the spindle 4, and having holes at the ends through which the screw 12 passes. This screw 12 passes also through the threaded hole of the lug 11 carrying the illuminator clamp 10, which consists of a resilient split tube. In threaded engagement with the screw 12 is the thumb nut 14, whereby one end of the spindle clamp 9 may be securely clamped between the lug 11 and said nut 14. The function of the screw 12 is twofold; by turning the screwhead 13, this screw 12 will tighten or loosen the spindle clamp 9 so as to accommodate spindles of different diameters, and the same screw 12 also serves as a pivot whereby the illuminator clamp 10 can be angularly adjusted with respect to the spindle clamp 9 (see dotted lines in Fig. 3), and can be secured in any angular position by tightening the thumb nut 14.

Slidably carried and resiliently secured by the illuminator clamp 10 is the illuminator tube 15, shown in detail in Fig. 2 of the drawing. It is an essential feature of my invention that the lower end of this tube 15 is formed as a spherical socket enclosing the ball-shaped end of the Lucite element 16, giving a perfectly flexible coupling which permits the angular adjustment of the Lucite element to suit the various forms of the analyzing pins used in the art.

Attached to the upper end of the illuminator tube 15 is the plug 17, having a threaded cavity 18 for holding the electric lamp 19. Wires 20 and 21 serve to supply energy for said lamp. Interposed between said plug 17 and the ball-shaped end of the Lucite element 16 is the spring 22, the function of which is to hold the ball-shaped end of the Lucite element in the spherical socket of tube 15.

The operation of my invention is as follows:

The selected analyzing pin is attached to the pin holder 6 by means of the screw 7. Then, after loosening the nut 14, the illuminator tube 15 is brought into the required angular position, and secured in this angular position by tightening the nut 14. Following this, the Lucite element is brought into the proper position to the analizing pin by turning the Lucite element in its ball and socket joint and also, if necessary, by sliding the illuminator tube in the illuminator clamp. Finally, the electric lamp 19 is switched on producing a screen of diffused light by means of the Lucite element.

It is to be understood that the form of my invention, herewith shown and described, is to be taken as a preferred example of the same, and that various changes in the shape, size and in the arrangement of parts may be resorted to, without departing from the spirit of my invention, or the scope of the subjoined claims.

I claim:

1. A dental model surveyor comprising, in combination with a base; a supporting stand mounted on said base; a sleeve carried by said stand; a spindle slidably and rotatably mounted in said sleeve; clamping means for securing said spindle in position in said sleeve; an analyzing pin secured to the lower end of said spindle; a spindle clamp attached to said spindle; an illuminator clamp pivotally connected to said spindle clamp permitting the changing of its angular position; clamping means to secure said illuminator clamp in its angular position; an illuminator tube slidably mounted in said illuminator clamp, and having at its lower end a spherical socket; a Lucite element with a ball-shaped upper end rotatably mounted in said spherical socket; an electric lamp, mounted within said illuminator tube and being adapted to project light unto said ball shaped end of the Lucite element.

2. A dental model surveyor comprising in combination a spindle; an analizing pin carried by said spindle; an illuminator tube pivotally connected to said spindle so as to permit the changing of its angular position with respect to said spindle; a Lucite element attached to said illuminator tube by a ball and socket connection, permitting the changing of its angular position with respect to said tube; an electric lamp mounted within said illuminating tube, and being disposed so as to illuminate said Lucite element.

3. In a dental model surveyor the combination comprising a spindle carrying an analizing pin; an illuminator tube, carried by, and angularly adjustable to, said spindle; an electric lamp mounted in said illuminator tube; a Lucite element having a ball and socket connection with said illuminator tube, and being disposed so as to receive light from said lamp.

4. In a dental model surveyor the combination comprising a spindle carrying an analizing pin; an illuminator tube, externally attached to said spindle; an electric lamp mounted within said illuminator tube; a Lucite element having a ball and socket connection with said illuminator tube, and being disposed so as to be illuminated by said lamp.

No references cited.